May 29, 1928.
A. R. ROSS
BAKING PAN
Filed Feb. 9, 1926
1,671,450
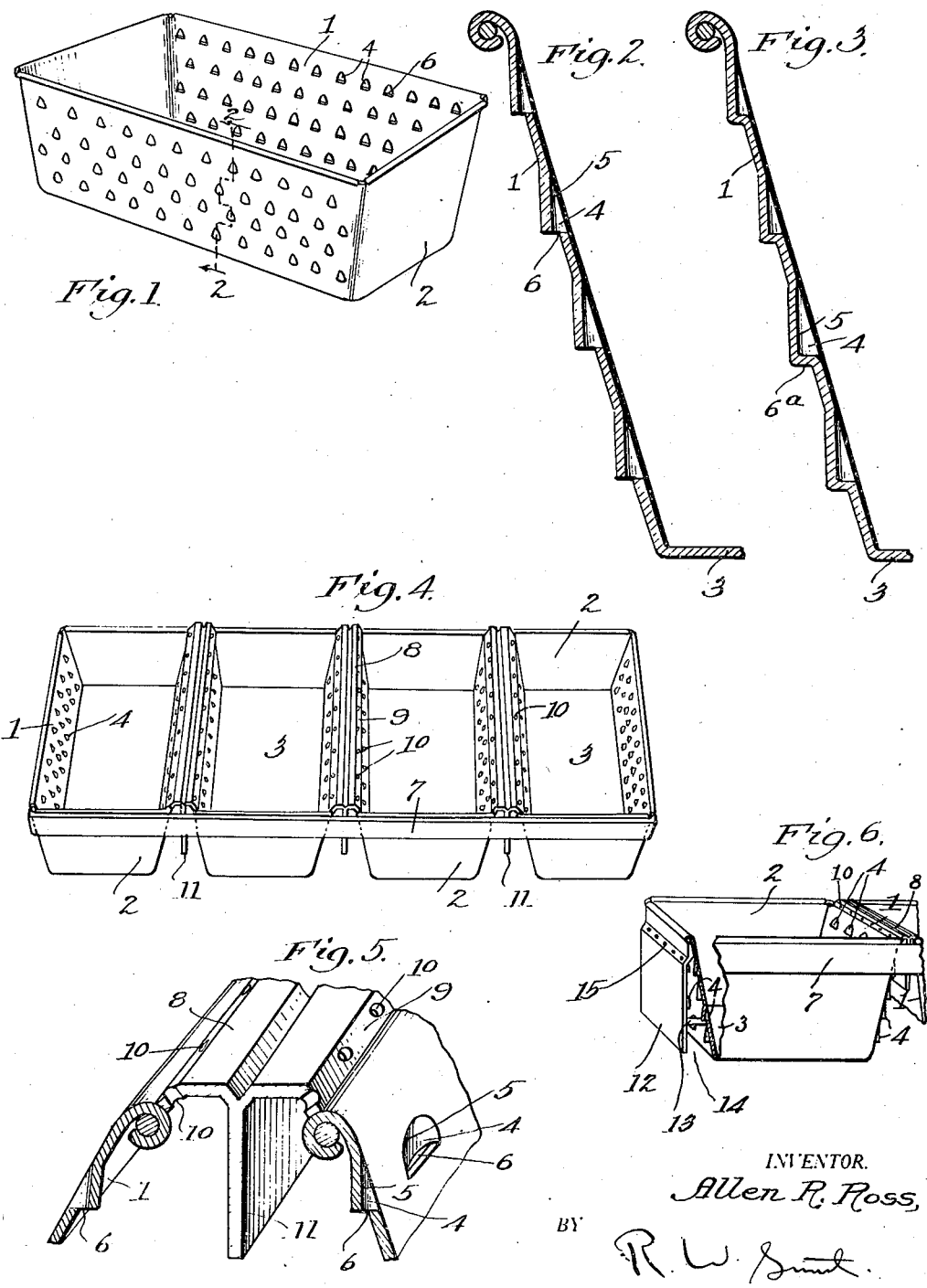
INVENTOR.
Allen R. Ross,
BY
R. W. Smith
ATTORNEY.

Patented May 29, 1928.

1,671,450

UNITED STATES PATENT OFFICE.

ALLEN R. ROSS, OF LOS ANGELES, CALIFORNIA.

BAKING PAN.

Application filed February 9, 1926. Serial No. 87,051.

This invention is a pan particularly adapted for baking bread, and it is the object of the invention to deflect the heat so as to insure quick and even baking and produce a loaf with well baked sides leaving a well colored and uniform crust.

It is a further object of the invention to provide heat deflecting means which may be incorporated in the manufacture of new pans or which may be embodied in old pans of standard construction.

It is a still further object of the invention to provide for deflecting heat through the side walls of a pan; and if desired to also deflect the heat across the top of the pan.

The invention will be readily understood from the following description of the accompanying drawings, in which:

Fig. 1 is a perspective view of a pan constructed in accordance with the invention.

Fig. 2 is a detail section on the line 2—2 of Fig. 1.

Fig. 3 is a view similar to Fig. 2 but showing a modified construction.

Fig. 4 is a perspective view of a set of the improved pans.

Fig. 5 is a detail section through adjacent pans of a set.

Fig. 6 is a perspective view of the end pan of a set.

The invention is embodied in a usual bread-baking pan having flaring walls extending upwardly from a base; the side walls 1 being connected by the end walls 2, and the base of the pan being shown at 3.

The inner surfaces of the side walls 1 are indented in order to form projections 4 at the exterior of the side walls; and said projections are preferably arranged in vertically spaced horizontal rows with the projections of next adjacent rows staggered as shown in Fig. 1.

The indentations comprise upright walls 5 flaring from the side walls 1 and preferably terminating at their lower ends in spaced relation from the side walls so as to form slots 6 opening vertically through the walls as shown in Fig. 2.

A modified construction is shown in Fig. 3 where the upright walls 5 terminate at their lower ends in substantially horizontally projecting solid walls 6ª which merge into the side walls 1.

With either construction of the projections, the upright walls 5 preferably slant outwardly slightly towards their upper ends in order that the loaf baked in the pan will not bind in the indentations when it is removed.

The heat ascending along the sides of the pan strikes either the horizontally projecting solid walls 6ª or passes through the vertical slots 6, and is consequently deflected for maximum heating efficiency at the sides of the loaf. Uniform baking of the outside of the loaf and thorough distribution of the heat is thus insured by the increased heat radiation and deflection at the sides of the pan.

Pans constructed in accordance with the invention may be assembled in standard sets, with the pans side by side in slightly spaced relation and connected by usual straps 7 as shown in Fig. 4. The heat rising between next adjacent pans is deflected by the projections 4; and in order to further retard and deflect the heat, baffles 8 may connect the upper edges of next adjacent pans.

The baffles 8 preferably extend the length of the spaces between adjacent pans, and in order to provide the necessary draft for the heat while still deflecting the heat against the side walls, apertures 10 may open through the baffles. The apertures are preferably arranged so that the heat passing therethrough is deflected across the tops of the pans, and for this purpose the apertures open through the sides 9 of the baffles which slant downwardly and outwardly as shown in Fig. 5.

To insure equal deflection of the heat against the walls at opposite sides of the spaces between next adjacent pans, vertical webs 11 extending the length of baffles 8 may depend from the baffles medially of the spaces between next adjacent pans.

A protection plate 12 which is adapted to guide a peel blade under the pans of a set, may overlie the outer side wall of the end pan; and this plate is preferably fixed to the pan at its upper edge and then flares outwardly to form a restricted space between the pan and the plate.

The plate may be braced by studs 13, and the restricted space between the pan and the plate is open at its lower end as shown at 14. A draft through the restricted space is provided by apertures 15 opening through the flare of the plate near its upper end, and heat will consequently pass through opening 14 into the space in back of the plate so as to be deflected by the projections 4 for properly heating the outer side wall of the end pan of the set.

I claim:

1. A baking pan having a side wall flaring outwardly from the base of the pan, and a bulge in said side wall forming a substantially upright depression in the interior surface of said side wall and a corresponding protuberance beyond the exterior surface of the side wall, the wall of said bulge merging into the side wall at its upper end flaring outwardly not beyond the vertical toward its lower end.

2. A baking pan having a side wall flaring outwardly from the base of the pan, and a bulge in said side wall forming a substantially upright protuberance beyond the exterior surface of the side wall, the wall of said bulge merging into the side wall at its upper end and flaring outwardly toward its lower end with an opening extending substantially vertically into the pan between said lower end of the wall of the bulge and the side wall of the pan.

3. A baking pan having a side wall flaring outwardly from the base of the pan, and a substantially upright protuberance at the exterior of said side wall merging into the side wall at its upper end and flaring outwardly toward its lower end.

4. A baking pan having a side wall flaring outwardly from the base of the pan, and a substantially upright protuberance at the exterior of said side wall merging into the side wall at its upper end and flaring outwardly toward its lower end with an opening extending substantially vertically into the pan through said lower end of the protuberance.

5. A baking pan having a plate spaced from a side of the pan and provided with openings so as to direct the heated air through the space between the pan and plate and across the top of the pan.

6. A baking pan having a baffle projecting laterally from the upper edge of its wall and a plate depending from the baffle in spaced relation from the pan, said baffle having apertures opening therethrough at an angle providing for passage of heat through the space between the pan and plate and across the top of the pan.

7. A baking pan having a baffle projecting laterally from the upper edge of its wall and having apertures opening through the baffle directed so as to deflect heated air across the top of the pan.

8. A baking pan having a heat deflecting projection at the exterior of its wall, and a plate depending from said wall and having an opening therethrough at its upper end and spaced from said wall at its lower end for upward passage of heat through said space and outwardly through said opening with the heat during its passage impinging against the heat deflecting projection.

9. A baking pan having a heat deflecting projection at the exterior of its wall, and a baffle projecting laterally from the upper edge of said wall and having apertures opening therethrough for passage of heat along the wall so as to impinge against the heat deflecting projection, said apertures opening through the baffle at an angle for deflecting the heat across the top of the pan.

10. A set of baking pans having spaced adjacent side walls provided with exterior heat deflecting projections, and baffles at the upper edges of said side walls and extending across the spaces between adjacent pans, said baffles having apertures opening therethrough for deflection of heat across the tops of the pans.

In testimony whereof I have affixed my signature to this specification.

ALLEN R. ROSS.